US011067705B1

(12) United States Patent
Zhang et al.

(10) Patent No.: US 11,067,705 B1
(45) Date of Patent: Jul. 20, 2021

(54) CNN-BASED ABNORMALITY SCORE MAP FOR SPECT GAMMA CAMERA FLOOD ANALYSIS

(71) Applicant: Siemens Medical Solutions USA, Inc., Malvern, PA (US)

(72) Inventors: Shuchen Zhang, Champaign, IL (US); Leonard Anzelde, Elgin, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 65 days.

(21) Appl. No.: 16/737,048

(22) Filed: Jan. 8, 2020

(51) Int. Cl.
*G01T 1/164* (2006.01)

(52) U.S. Cl.
CPC .......... *G01T 1/1647* (2013.01); *G01T 1/1642* (2013.01)

(58) Field of Classification Search
CPC ......... G01T 1/00; G01T 1/1642; G01T 7/005; G01T 1/1647; G01T 1/1648; G01T 1/166
See application file for complete search history.

(56) References Cited

U.S. PATENT DOCUMENTS

| | | | | |
|---|---|---|---|---|
| 5,576,548 | A | * | 11/1996 | Clarke ................. A61B 6/4258 250/369 |
| 6,559,450 | B1 | | 5/2003 | Berlad et al. |
| 8,022,357 | B2 | * | 9/2011 | Amir ..................... G01T 1/1648 250/252.1 |
| 8,415,632 | B2 | * | 4/2013 | Tsukerman ............ G01T 7/005 250/363.09 |
| 9,606,245 | B1 | * | 3/2017 | Czarnecki ............. G01T 1/1642 |

OTHER PUBLICATIONS

Napoletano, P. Piccoli, F. And Schettini, R. (2018). Anomaly Detection in Nanofibrous Materials by CNNBased Self-Similarity. Sensors, 18(2), 209.
Simonyan, Karen & Zisserman, Andrew. (2014). Very Deep Convolutional Networks for Large-Scale Image Recognition. arXiv 1409.1556.

* cited by examiner

*Primary Examiner* — David P Porta
*Assistant Examiner* — Fani Boosalis (57) ABSTRACT

A method for determining an abnormality score map for Single-photon Emission Computed Tomography (SPECT) gamma camera flood analysis includes extracting a plurality of image patches from an input flood image and generating a feature vector for each image patch. A per-patch abnormality score is generated for each feature vector by comparing the feature vector against a normal flood feature dictionary comprising one or more normal flood feature vectors generated using a plurality of normal flood images. Then, an abnormality score map may be generated to depict the per-patch abnormality scores for the input flood image.

19 Claims, 12 Drawing Sheets

Example 5: Artifacts in center and corners

Abnormality Score Map

Original Flood

Thresholded Abnormality Score Map

CNN-BASED ABNORMALITY SCORE MAP FOR SPECT GAMMA CAMERA FLOOD ANALYSIS

TECHNICAL FIELD

The present disclosure relates generally to using a convolutional neural network (CNN) to generate an abnormality score map based on one or more input images. The various systems, methods, and apparatuses described herein may be used, for example, for single-photon emission computed tomography (SPECT) intrinsic flood classification to analyze SPECT gamma detector health.

BACKGROUND

A conventional technique for calibrating a single-photon emission computed tomography (SPECT) scanner is to irradiate the detector array of the scanner with an annihilation flood source to generate a two-dimensional distribution of the detected events, referred to as a "flood image." Using techniques generally known in the art, a calibration map can be generated from the flood image to map the position of radiation events to the actual position of a corresponding scintillator crystal. This calibration map can then be used to correct for any geometric distortions in acquired image data.

For assessing the health of a scanner's gamma detector, a static "intrinsic" flood image is used. An intrinsic flood image is a flood image acquired with the collimator of the scanner removed. Once acquired, the intrinsic flood image is analyzed to identify non-uniformities such as edge packing artefacts and the presence of tube patterns in acquired images. These issues can then be addressed, either by applying corrections to image data or, in severe cases, by replacing hardware components of the SPECT scanner.

At present, flood analysis is performed by human observer with visual evaluation, aided by the uniformity measures defined by National Electrical Manufacturers Association (NEMA). The engineers performing the analysis typically have various levels of experience with the flood evaluation. As a result, the conclusions made by one engineer may be inconsistent with those made by other engineers. Manual image processing methods such as adjusting contrast, smoothing, edge detection and thresholding for locating the anomalous regions have also been explored for flood analysis. However, these techniques often do not highlight all types of anomalies that may be present in a flood image.

SUMMARY

Embodiments of the present invention address and overcome one or more of the above shortcomings and drawbacks, by providing methods, systems, and apparatuses related to a Convolutional Neural Network (CNN)-based abnormality score map designed to locate the anomalous regions in the flood images generated from a SPECT Gamma detector.

According to some embodiments, a method for determining an abnormality score map for SPECT gamma camera flood analysis includes extracting a plurality of image patches from an input flood image and generating a feature vector for each image patch. A per-patch abnormality score is generated for each feature vector by comparing the feature vector against a normal flood feature dictionary comprising one or more normal flood feature vectors generated using a plurality of normal flood images. Then, an abnormality score map may be generated to depict the per-patch abnormality scores for the input flood image.

According to other embodiments, a system for determining an abnormality score map for SPECT gamma camera flood analysis comprises a SPECT scanner and a computing system. The SPECT scanner is configured to generate an input flood image. The computing system comprises one or more processors configured to perform the method discussed above. In some embodiments, the system further comprises a computing monitor or other display for presenting the abnormality score map.

According to other embodiments, a method for generating a feature dictionary for use in SPECT gamma camera flood analysis includes extracting a plurality of normal flood image patches from a plurality of normal flood images, and using a trained convolutional neural network to extract a normal flood feature vector for each normal flood image patch. A clustering algorithm 120 is applied to the normal flood feature vectors, thereby yielding a reduced set of normal flood feature vectors. A normal flood feature dictionary is created comprising the reduced set of normal flood feature vectors. The normal flood feature dictionary may then be deployed to one or more SPECT scanners for performing gamma camera flood analysis.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses related to using a Convolutional Neural Network (CNN)-based abnormality score map designed to locate the anomalous regions in the flood images generated from a SPECT gamma detector. The techniques described herein score the normality level based on how much a sub-region of a questionable flood image (QFI) deviates from a dictionary of "normal" sub-regions generated from the flood images without non-uniformities due to hydration, artifacts and tubeyness, etc.

The techniques described herein have a number of advantages and unique features compared to conventional flood analysis methodologies. First, the disclosed techniques use an overlapping windowing method that is designed to extract sub-regions with defined size, which will be denoted as patches, from the flood images. This facilitates the automatic regional classification of normal versus abnormal patches. This approach provides more details compared with NEMA uniformity measures. The overlapping windowing method also helps increase the size of dataset, resulting in better accuracy.

Second, the techniques described herein do not rely on a dataset of abnormal floods with prior knowledge of where the anomalous regions are. Normal flood images (i.e., images without non-uniformities) are the only dataset required to build this model.

Third, beyond the statistics measures solely based on the pixel intensities, the disclosed techniques generate feature maps through the CNN which represent the hidden structures and intensity distribution within the flood images. For example, in various embodiments described below, a pre-trained Visual Geometry Group 19 (VGG19) Neural Network, with its last few fully connected layers removed, is used as a fixed feature extractor for both normal and abnormal patches from the original flood images.

Fourth, in some embodiments, a normal feature dictionary is generated through the use of the VGG19-based feature extractor, and is used as a reference for analyzing the features extracted from the patches in the QFI. A clustering algorithm (e.g., K-mean clustering) is applied to create most representative feature maps generated from the normal patches, so as to reduce the computation time by reducing the number of comparisons between normal feature maps and the feature maps of the QFI.

Fifth, the model described herein is a one-fit-all model which could be used for various types of floods. It could be applied to any type of flood images (on/off-peak, energy and linearity correction on/off, various count densities, various file types, etc.). The disclosed CNN could learn that circular non-uniformities due to PMTs are regular patterns recurring throughout the flood images and would not classify them as anomalies. Thus, even in the off-peak floods where the PMTs are as prominent as anomalies, CNN is able to differentiate the two.

Figure 1:
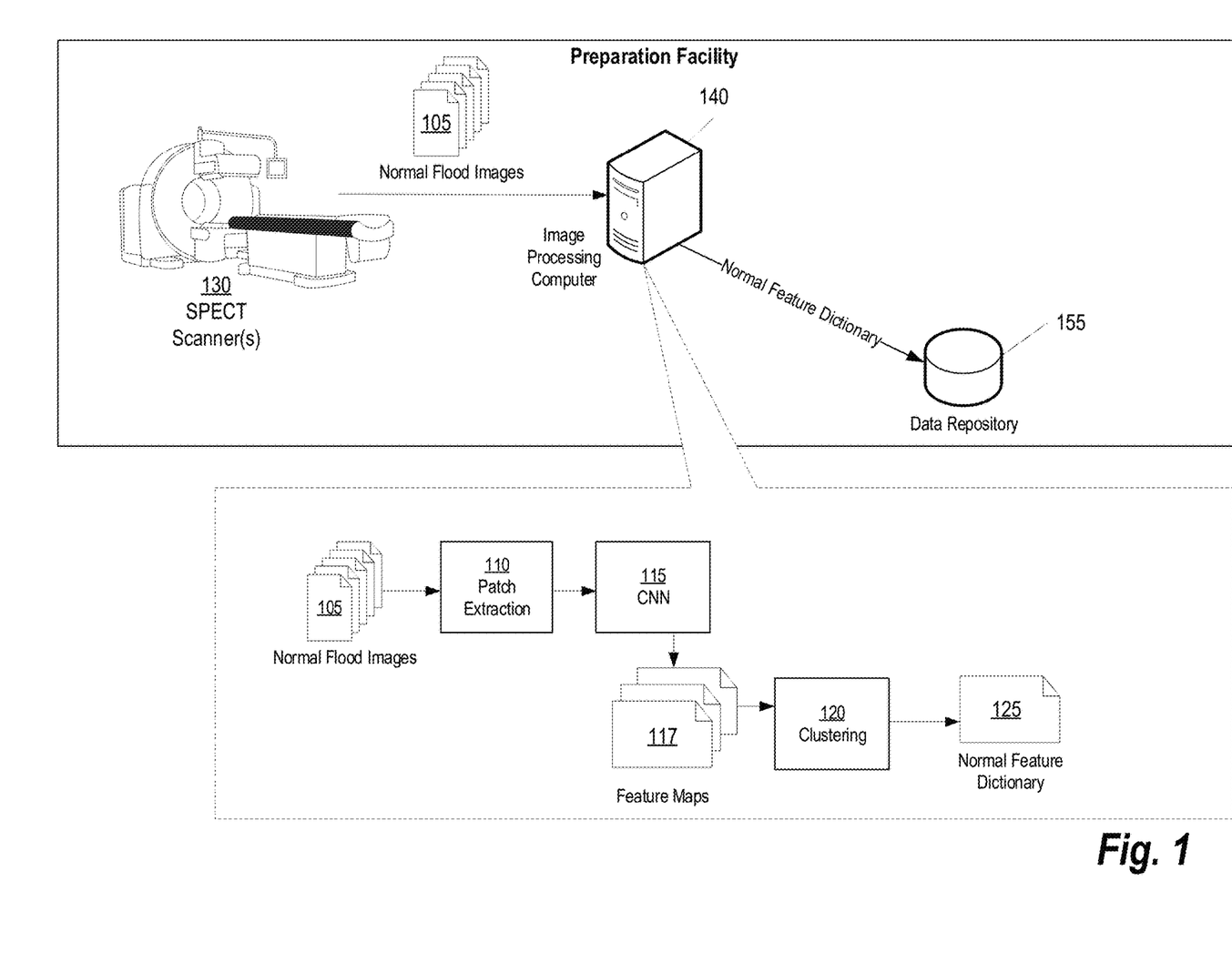
FIG. 1 illustrates a system for creating the normal feature dictionary, according to some embodiments.
Figure 2:
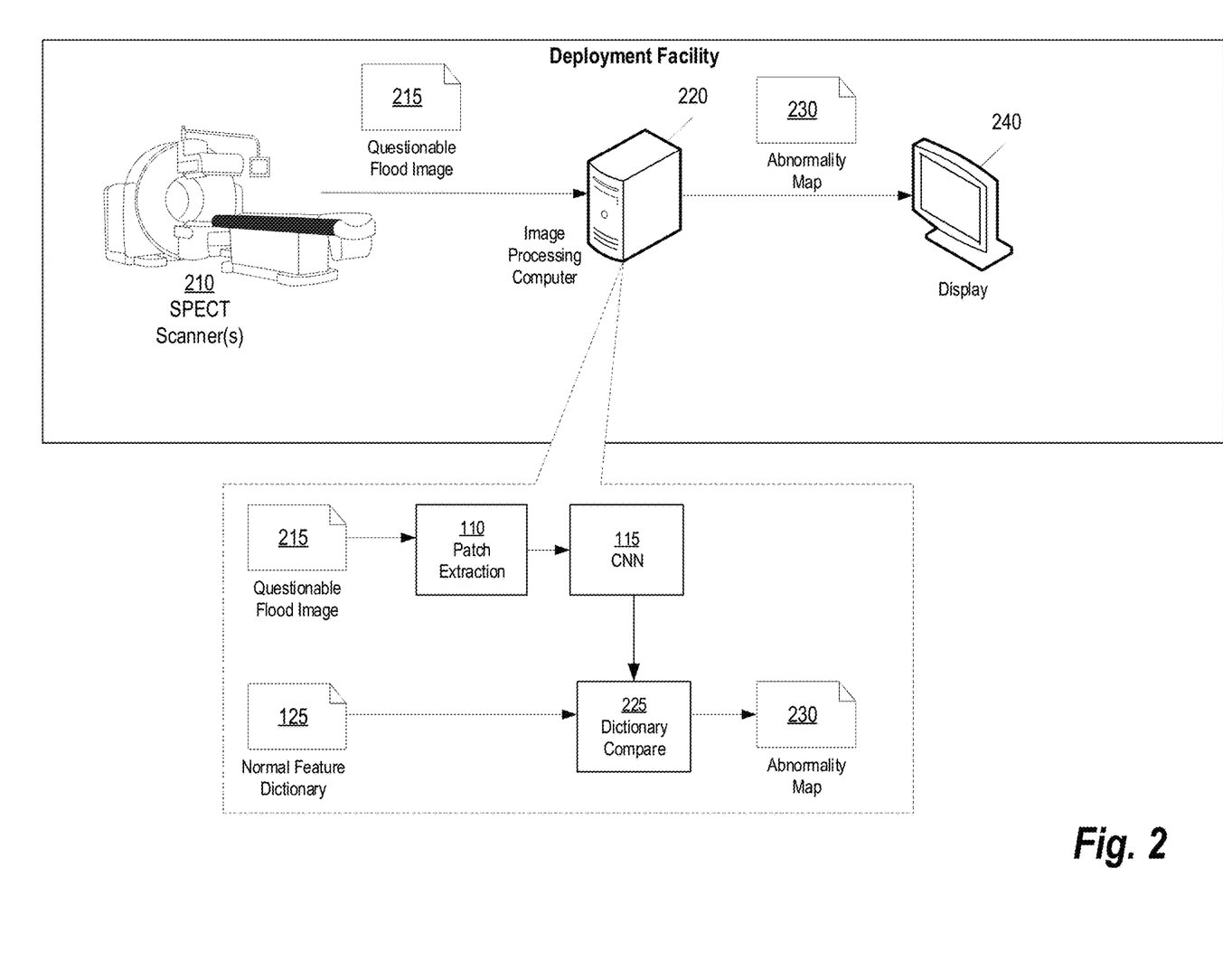
FIG. 2 illustrates how the normal feature dictionary is used during deployment, according to some embodiments.

As illustrated by FIG. 1 and FIG. 2, the scoring system described herein includes two operation phases: the preparation phase and the deploy phase. During preparation, a plurality of feature vectors are generated from patches of a plurality of normal flood images. These feature vectors are used to create a Normal Feature Dictionary. During deployment, the feature vectors generated from each patch of the QFI are compared against the Normal Feature Dictionary by taking the Euclidean distance as the abnormality score for all the pixels in the sub-region. In other embodiments other distance measurements may be used (e.g., cosine similarity). Next, the abnormality score of each pixel is obtained by averaging the abnormality scores of the sub-regions it belongs to and so the normality map of the entire QFI is generated. Then, the pixels which are beyond a defined threshold is marked as the potential region of anomalies.

FIG. 1 illustrates a system for creating the normal feature dictionary, according to some embodiments. In this example one or more SPECT Scanners 130 provide Normal Flood Images 105 to the Image Processing Computer 140. The Normal Flood Images 105 may be assembled, for example, based on human review and designation of flood images as being "normal." The definition of what is normal vs abnormal may vary; however, in general, a normal flood image should not contain non-uniformities due to hydration, artifacts and tubeyness, etc.

Figure 3:
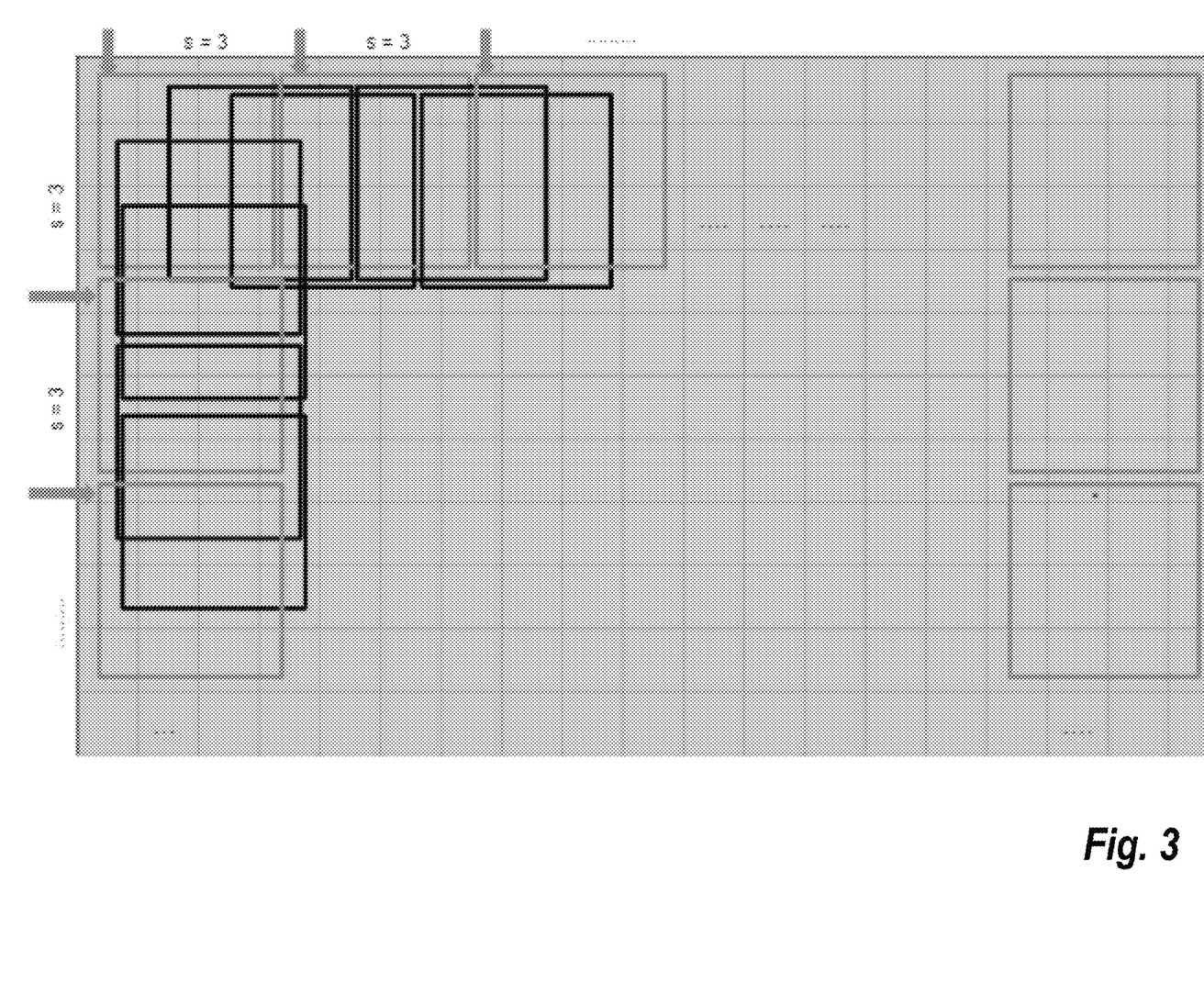
FIG. 3 shows an example patch selection mechanism used in some embodiments.

The Flood Images 105 are input into a Patch Extraction Module 110 executed by the Image Processing Computer 140. The Patch Extraction Module 110 extracts a plurality of patches from the Flood Images 105. The size and number of patches may be pre-determined or set based on a user-selected value. The Patch Extraction Module 110 uses an overlapping windowing method to extract the patches. The patches are generated from the overlapping views of the input image array, with adjacent windows of a pre-determined size (e.g., 128×128) shifted by a single row or column. Then every s-th patch along both dimensions are selected and the edge cases are handled through including the last patch on the selected columns and rows. The step size s may be selected chosen such that N patches could cover the entire image. A demonstration of patch selection algorithm with s=3 and patch size 4×4 is shown in FIG. 3. Once generated, each patch may be processed to meet any requirements of the CNN 115. For example, in one embodiment, each patch is resized to larger size (e.g., 224×224) and is converted to RGB image by cloning the color channels prior to input into the CNN 115.

As is generally understood in the art, CNNs are a class of learnable architectures adopted in many domains like image recognition, image annotation, image retrieval, etc. CNNs include a plurality of convolutional layers that generate feature maps summarizing the presence of features in an input image. The feature maps generated by the convolutional layers are generally sensitive to the location of features on the input image. To address this sensitivity, one or more pooling layers may be used to down sample the feature maps. This has the effect of summarizing the presence of features in patches of the feature map. In the example described in FIGS. 1-4, it is assumed that the CNN includes an average pooling layer that calculates an average value for each patch on the feature map. The output of this average pool layer are a plurality of Features Maps 117 that will used (following clustering 120) in formation of the Normal Feature Dictionary 125.

Figure 4:
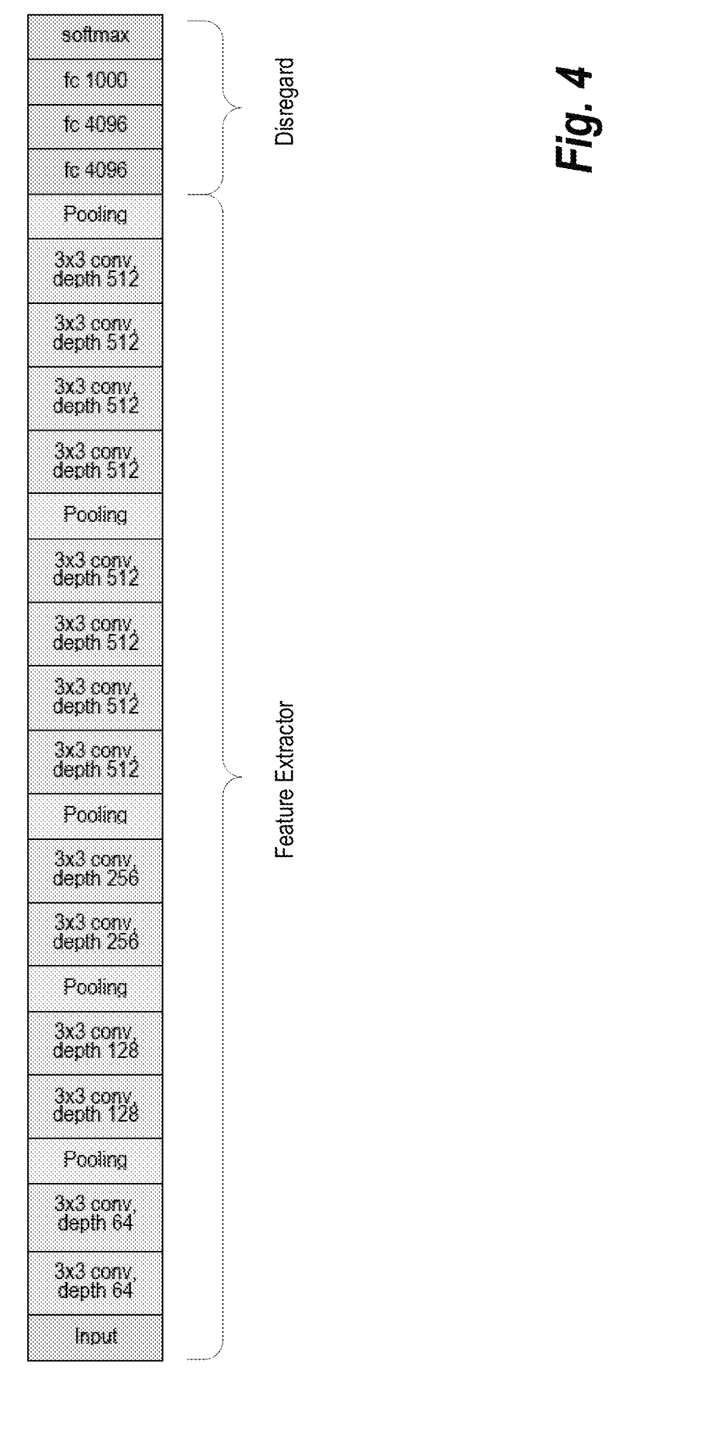
FIG. 4 shows an example VGG19 architecture used in some embodiments.

Various CNN architectures may be used for implementing the CNN 115 used in the dictionary preparation pipeline illustrated in FIG. 1. For example, in some embodiments, the VGG19 architecture is utilized because its good classification performance on the ImageNet dataset. The VGG19 architecture is 19 layers deep and has a good tradeoff between computation time and performance. The output of each convolutional layers in the network could be linearized into feature vectors and these feature vectors are frequently used for pattern recognition tasks. In some embodiments, the CNN 115 is pre-trained on an existing generic image data set (e.g., the 1000-class ImageNet classification set defined in the ILSVRC 2015 challenge). Though this pre-trained model we used is trained on scene and object images, previous research found that it has better performance than the one trained on texture images as recognizing scenes and objects and are more complicated than recognizing textures. The architecture of VGG19 is shown in FIG. 4.

There are G×N Feature Maps 117 in total generated from G×N patches of G normal images and they are reduced to just K feature vectors by applying one or more clustering algorithms known in the art such as k-mean clustering. These K best centroid feature vectors are the ones collected in the Normal Feature Dictionary 125. Once generated, the Normal Feature Dictionary 125 can be stored in a local or remote Data Repository 155 for later use during deployment.

FIG. 2 illustrates how the Normal Feature Dictionary 125 is used during deployment using an Image Processing Computer 220, according to some embodiments. The QFI 215 is used to input to the Patch Extraction Module 110 to extract N patches that, in turn, are used as input to the CNN 115 to generate N feature vectors. For each of these feature vector F, a Dictionary Comparison Module 225 finds the M closest feature vectors among the K centroid feature vectors in the Normal Feature Dictionary 125. The average of the Euclidean distances between F and these M most similar feature vectors is calculated and this is the abnormality score assigned to all the pixels in the sub-region defined by the corresponding patch. Because each pixel may belong to multiple patches, in some embodiments, the average of abnormality scores of all the corresponding sub-regions is the abnormality score for a certain pixel. The abnormality score shows how far each pixel/sub-region is from being normal. Thus, the higher the abnormality score is, the higher possibility the pixel/sub-region is being anomalous. In some embodiments, to mark the potential regions of anomalies, a threshold is applied to the abnormality map. The threshold could be defined, for example, as P standard deviations from the mean of the abnormality scores of all the pixels in the test image. Alternatively, a more complex thresholding can be used to mark out all the potential anomalous regions. For example in one embodiment, a threshold is determined based on the abnormality score map generated from a collection of normal flood images. Once generated, the Abnormality Map 230 (with or with the threshold applied) can be presented to a user on a Display 240.

Figure 5:
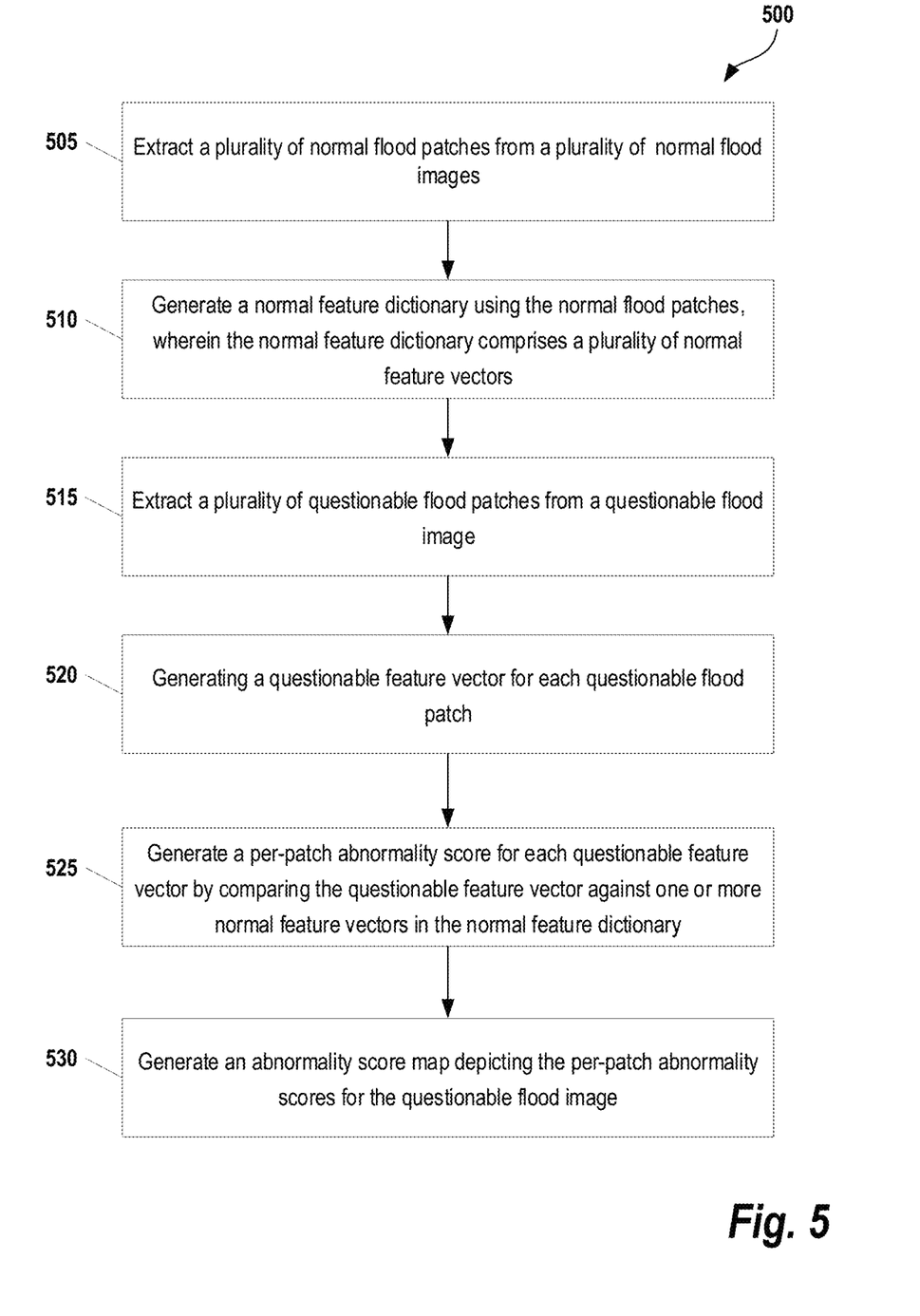
FIG. 5 illustrates an example method for determining an abnormality score map for SPECT gamma camera flood analysis, according to embodiments of the present invention.
Figure 12:
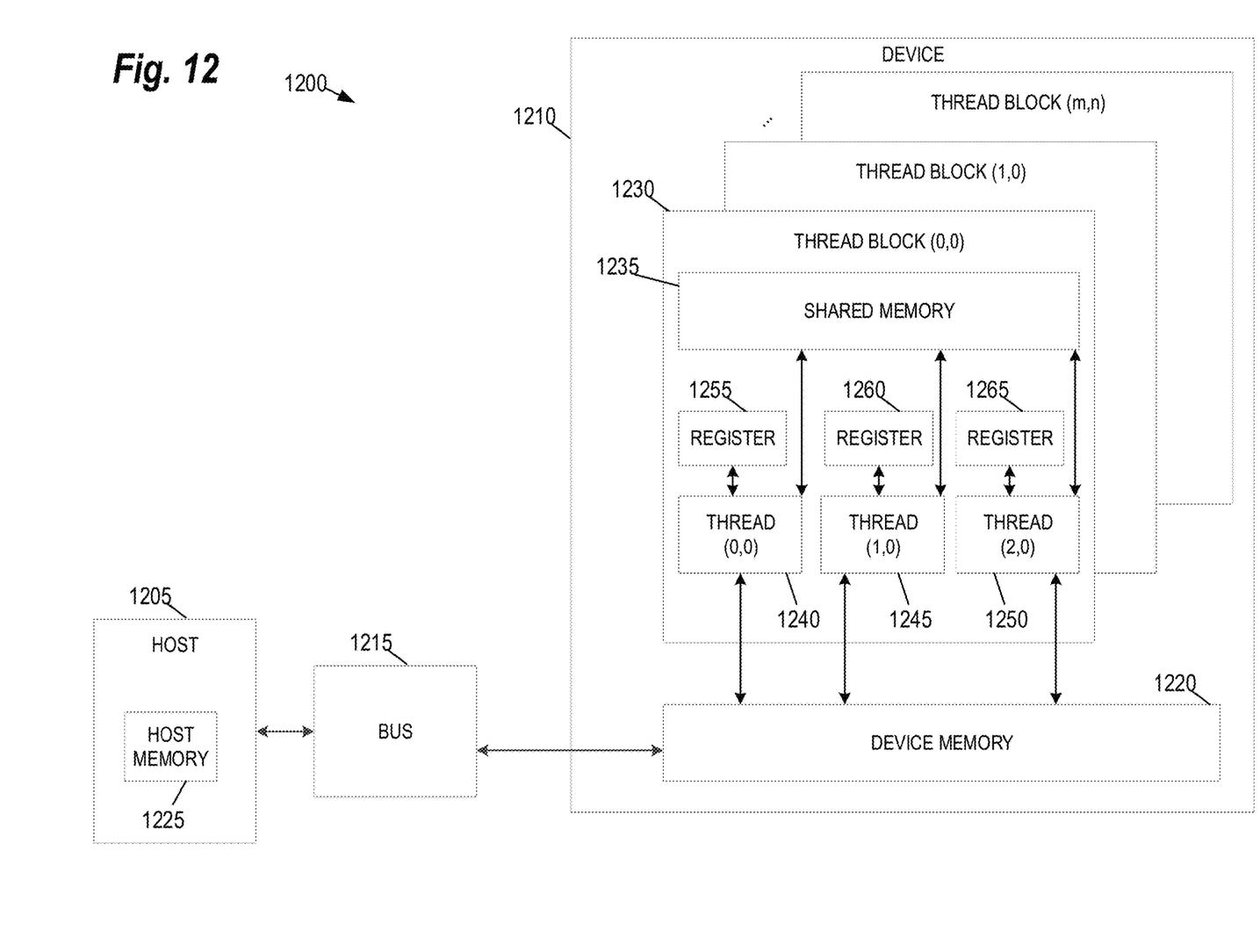
FIG. 12 illustrates an exemplary computing environment within which embodiments of the invention may be implemented.

FIG. 5 illustrates an example method 500 for determining an abnormality score map for SPECT gamma camera flood analysis, according to embodiments of the present invention. This method may be performed, for example, by a computing system that includes sufficient processing and storage resources to execute the CNN. One example computing system is shown in FIG. 12.

Starting at step 505, the computing system extracts a plurality of flood patches from a plurality of intrinsic flood images without any non-uniformities. Using the terminology discussed above, the intrinsic flood images are referred to as "normal" flood images and the flood patches are referred to as "normal" flood patches. In some embodiments, the normal flood patches are extracted using the overlapping windowing method discussed above that extracts overlapping views of the normal flood images. Next, at step 510, a the computing system generates a normal feature dictionary using the normal flood patches. This normal feature dictionary comprises a plurality of normal feature vectors. As noted above, in some embodiments, the normal feature dictionary is generated using the normal flood patches using a trained convolutional neural network to extract a feature vector for each normal flood patch. Then, a clustering algorithm is applied to the feature vectors generated for each normal flood patch. The reduced set of feature vectors that result are used as the normal feature dictionary.

Continuing with reference to FIG. 5, during steps 515-530, the dictionary is used to analyze a new flood image that may or may not include non-uniformities. The steps may be performed by the same computing system as described above or, in some instances, a separate computing system may be used. At steps 515-520, questionable flood patches are extracted from a new intrinsic flood image and a questionable feature vector is generated for each questionable flood patch. Next, at step 525, a per-patch abnormality score is generated for each questionable feature vector by comparing the questionable feature vector against one or more normal feature vectors in the normal feature dictionary. Then, at step 530, an abnormality score map is generated that depicts the per-patch abnormality scores for the questionable flood image.

In some embodiments, a per-pixel abnormality score is calculated for each pixel in the questionable flood image by averaging abnormality scores associated with each questionable flood patch that contains the pixel. The abnormality score map depicts then the per-pixel abnormality scores for each pixel in the questionable flood image. Additionally, in some embodiments, a threshold is applied to the map to designate one or more regions of the questionable flood image as being potentially abnormal. This threshold may be defined, for example, as pre-determined number of standard deviations from a mean value of the per-pixel abnormality scores or as pre-determined number of standard deviations from a mean value of the per-patch abnormality scores. In each case the number of standard deviations may be pre-set to a standard value, or the number may be a tunable parameter that may be set by the user.

Figure 6:
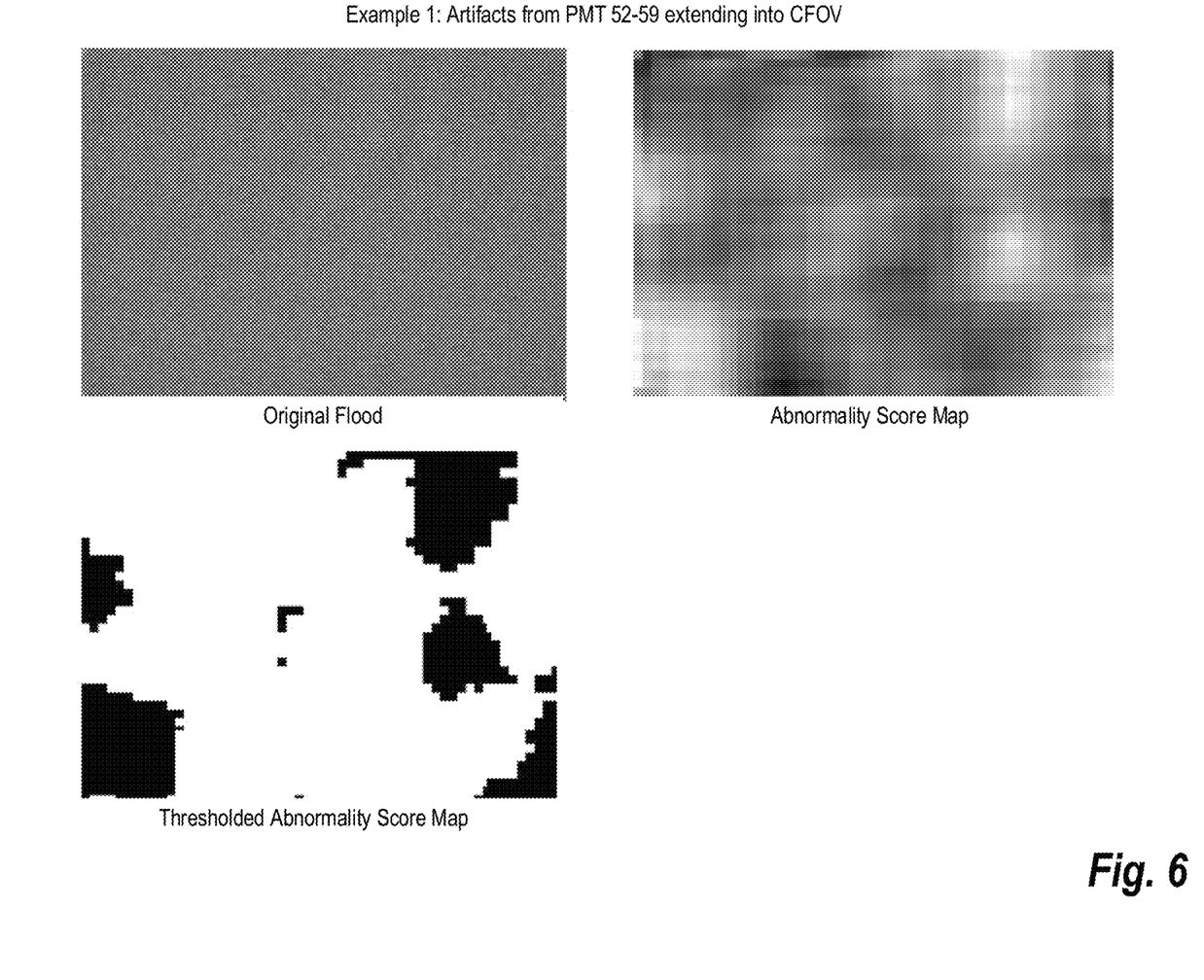
FIG. 6 shows an example flood image depicting artifacts from photomultiplier tubes (PMT) 52-59 extending into central field of view (CFOV), as well as a corresponding abnormality score map.
Figure 7:
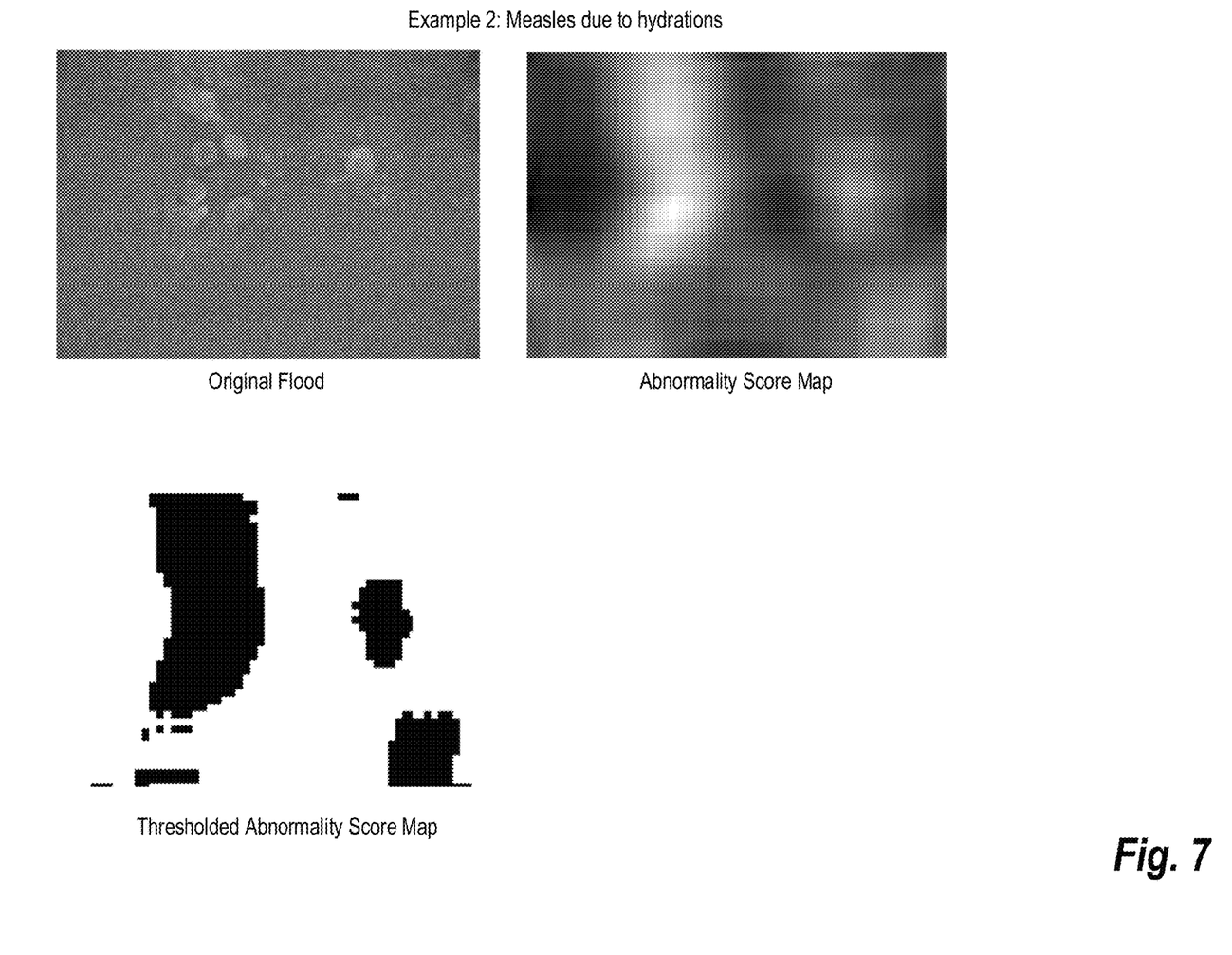
FIG. 7 shows an example flood image depicting measles due to hydration, as well as a corresponding abnormality score map.
Figure 8:
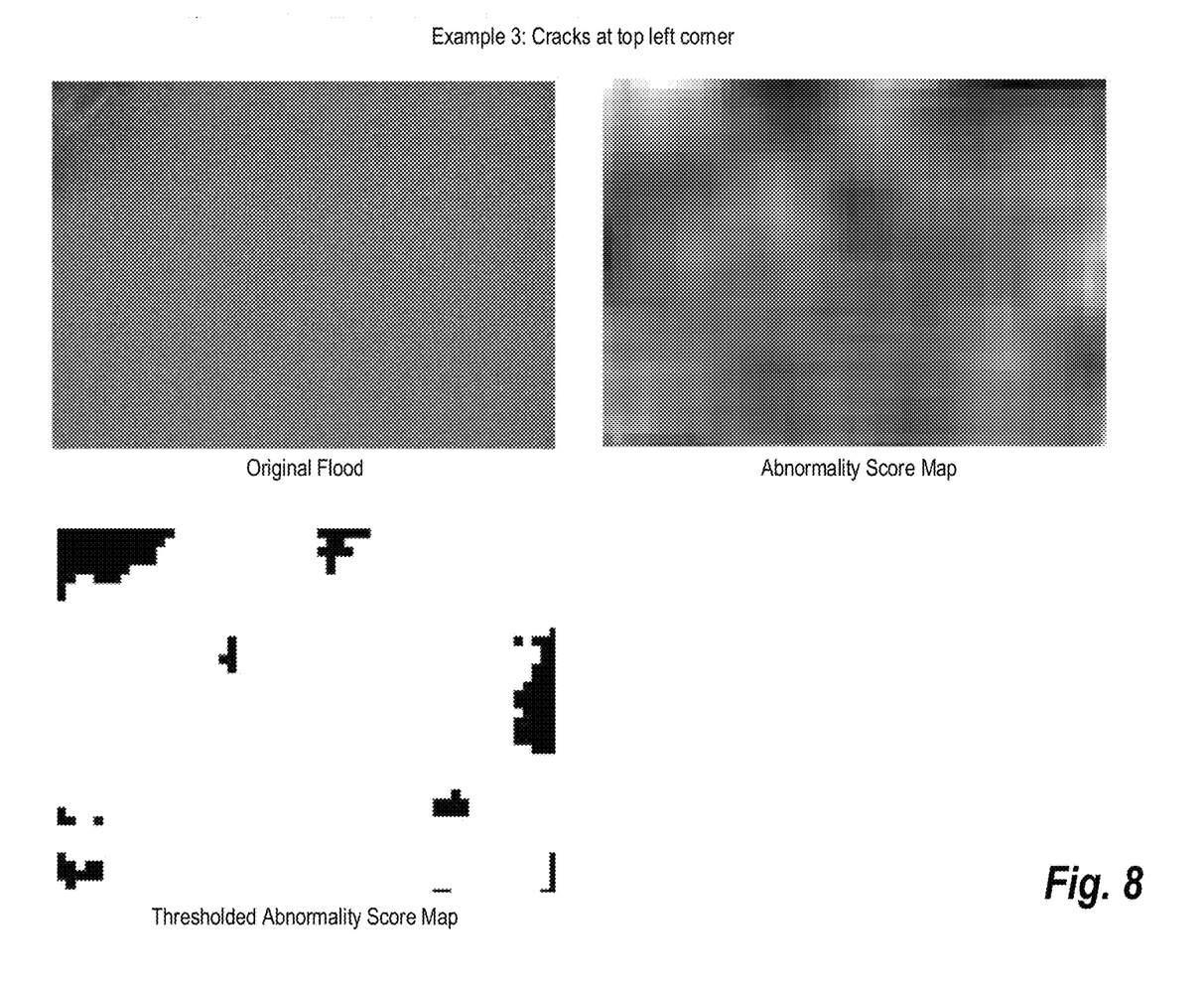
FIG. 8 shows an example flood image depicting cracks at the top left corner, as well as a corresponding abnormality score map.
Figure 9:
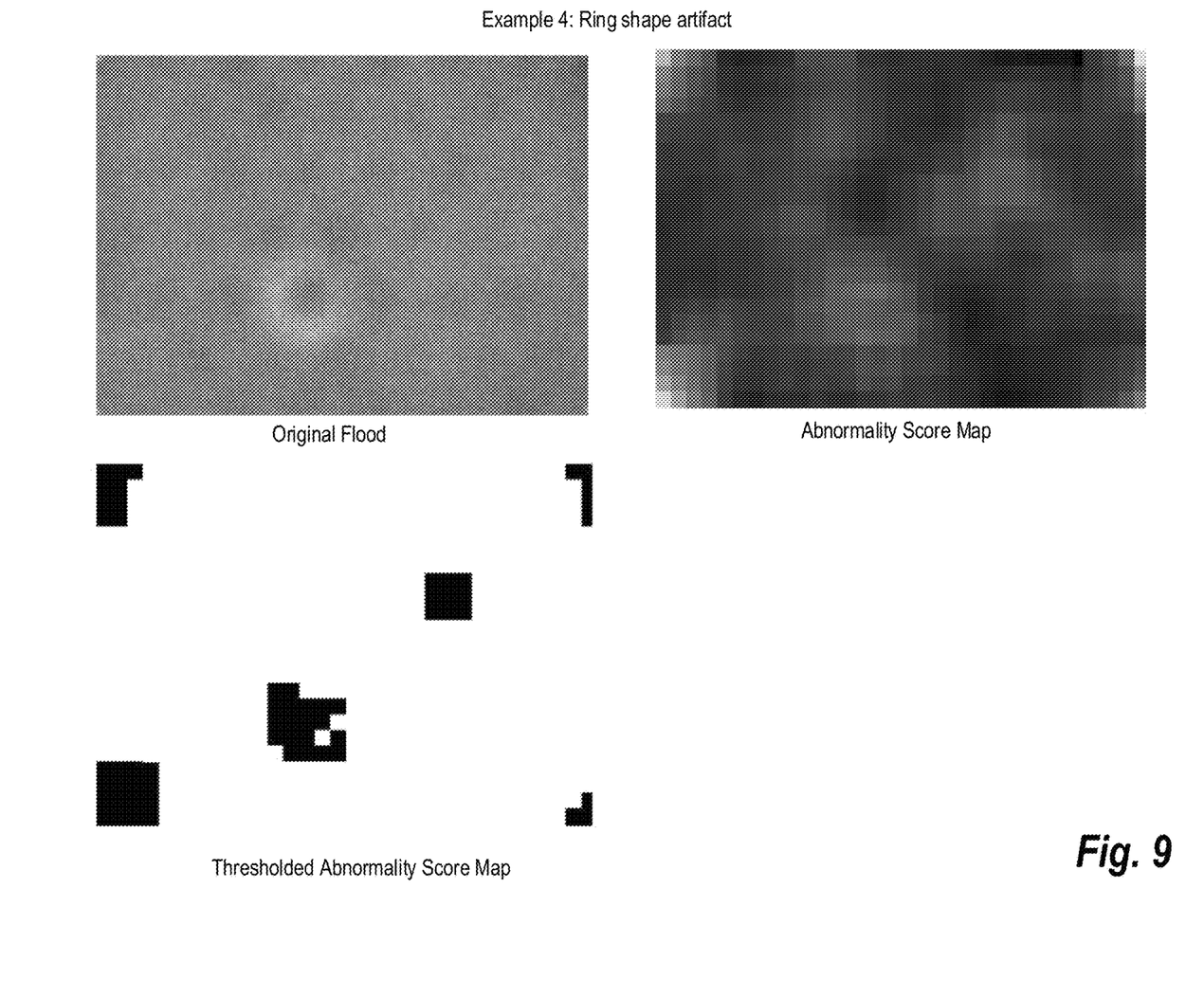
FIG. 9 shows an example flood image depicting a ring shape artifact, as well as a corresponding abnormality score map.
Figure 10:
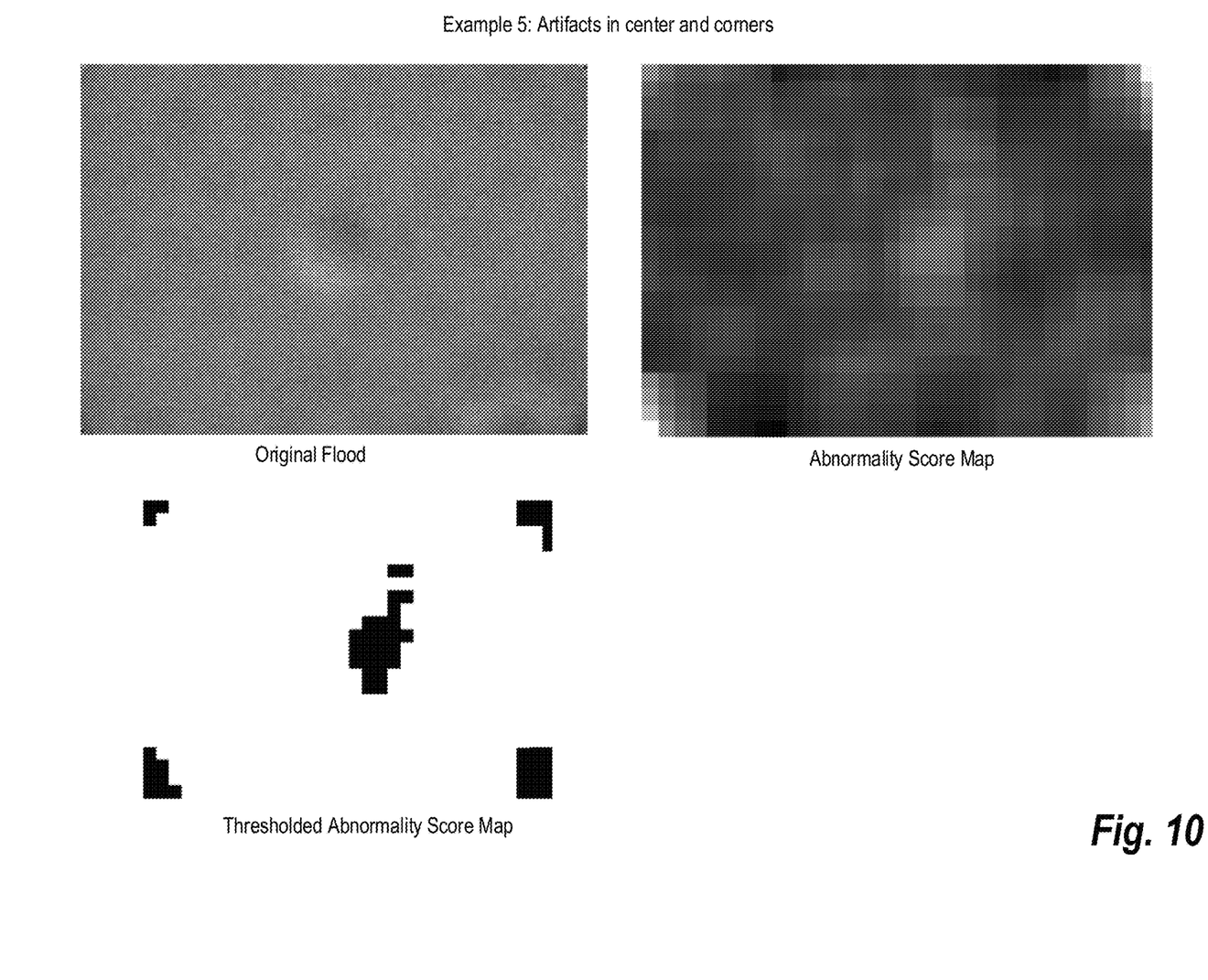
FIG. 10 shows an example flood image depicting artifacts in the center and corners, as well as a corresponding abnormality score map.
Figure 11:
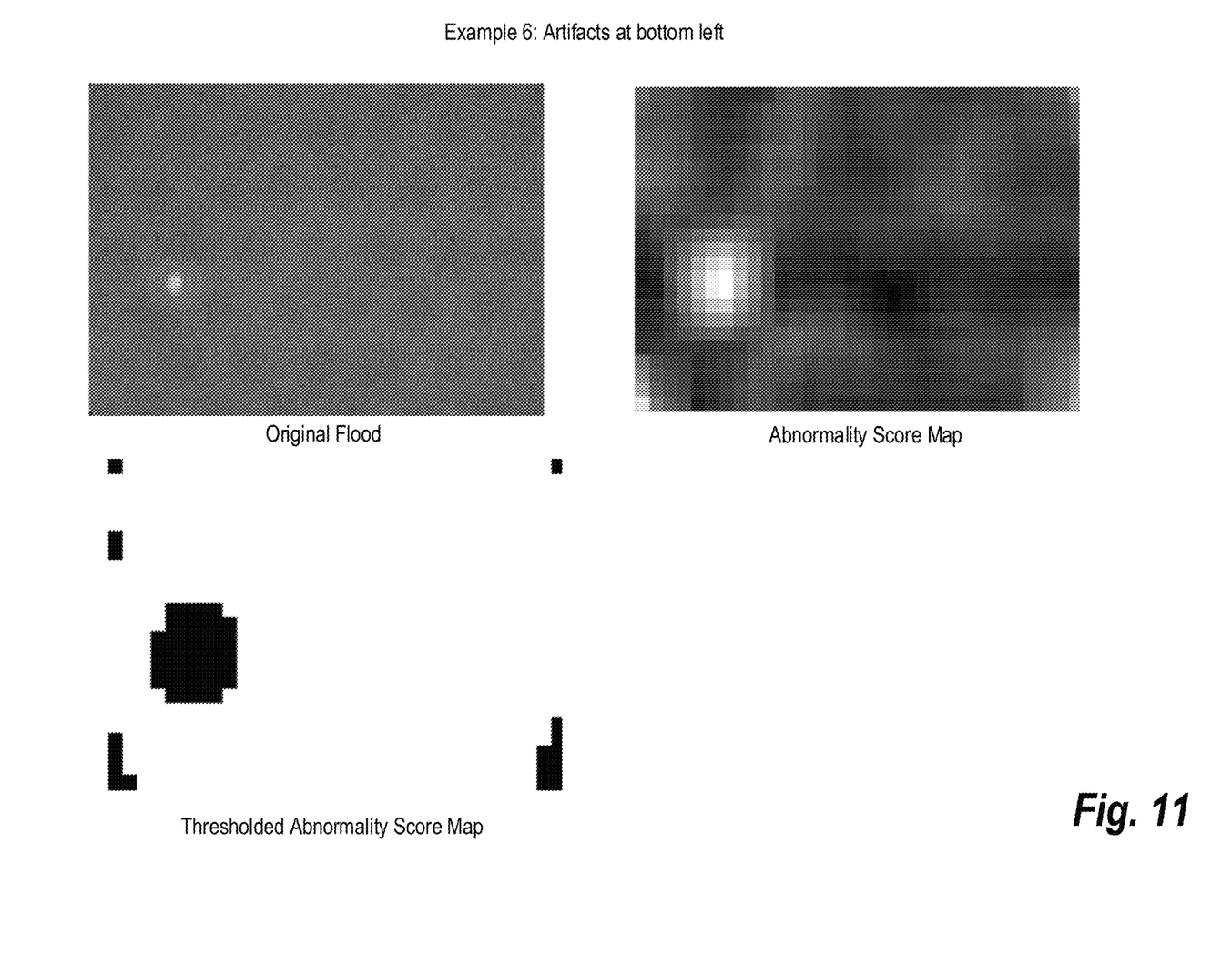
FIG. 11 shows an example flood image depicting artifacts at the bottom left, as well as a corresponding abnormality score map.

FIGS. 6-11 illustrate results generated during proof of concept experiments. The parameters for these experiment were patch size=128×128; s (step size for patch selection) =16; K (clusters)=100; and M=20. The brighter pixels in normality map have higher abnormality, black regions in thresholded normality map is the potential anomalous regions. FIGS. 6-8 show on-peak, energy and linearity correction-on QFI results, and FIGS. 9-11 show off-peak low, energy and linearity correction-on QFI results.

FIG. 12 provides an example of a parallel processing memory architecture 1200 that may be utilized to implement the image processing computer illustrated in FIGS. 1 and 2 discussed above. This architecture 1200 may be used in embodiments of the present invention where NVIDIA™ CUDA (or a similar parallel computing platform) is used. The architecture includes a host computing unit ("host") 1205 and a GPU device ("device") 1210 connected via a bus 1215 (e.g., a PCIe bus). The host 1205 includes the central processing unit, or "CPU" (not shown in FIG. 12) and host memory 1225 accessible to the CPU. The device 1210 includes the graphics processing unit (GPU) and its associated memory 1220, referred to herein as device memory. The device memory 1220 may include various types of memory, each optimized for different memory usages. For example, in some embodiments, the device memory includes global memory, constant memory, and texture memory.

Parallel portions of the CNN or other components shown in FIGS. 1 and 2 may be executed on the architecture 1200 as "device kernels" or simply "kernels." A kernel comprises parameterized code configured to perform a particular function. The parallel computing platform is configured to execute these kernels in an optimal manner across the architecture 1200 based on parameters, settings, and other selections provided by the user. Additionally, in some embodiments, the parallel computing platform may include additional functionality to allow for automatic processing of kernels in an optimal manner with minimal input provided by the user.

The processing required for each kernel is performed by a grid of thread blocks (described in greater detail below). Using concurrent kernel execution, streams, and synchronization with lightweight events, the architecture 1200 of FIG. 12 (or similar architectures) may be used to parallelize training tasks. For example, in some embodiments, processing of different image patches.

The device 1210 includes one or more thread blocks 1230 which represent the computation unit of the device 1210. The term thread block refers to a group of threads that can cooperate via shared memory and synchronize their execution to coordinate memory accesses. For example, in FIG. 12, threads 1240, 1245 and 1250 operate in thread block 1230 and access shared memory 1235. Depending on the parallel computing platform used, thread blocks may be organized in a grid structure. A computation or series of computations may then be mapped onto this grid. For example, in embodiments utilizing CUDA, computations may be mapped on one-, two-, or three-dimensional grids. Each grid contains multiple thread blocks, and each thread block contains multiple threads. For example, in FIG. 12, the thread blocks 1230 are organized in a two dimensional grid structure with m+1 rows and n+1 columns. Generally, threads in different thread blocks of the same grid cannot communicate or synchronize with each other. However, thread blocks in the same grid can run on the same multiprocessor within the GPU at the same time. The number of threads in each thread block may be limited by hardware or software constraints. In some embodiments, processing of individual patches or operations performed by the algorithms discussed herein may be partitioned over thread blocks automatically by the parallel computing platform software. However, in other embodiments, the individual thread blocks can be selected and configured to optimize processing of images.

Continuing with reference to FIG. 12, registers 1255, 1260, and 1265 represent the fast memory available to thread block 1230. Each register is only accessible by a single thread. Thus, for example, register 1255 may only be accessed by thread 1230. Conversely, shared memory 1235 is allocated per thread block, so all threads in the block have access to the same shared memory. Thus, shared memory 1235 is designed to be accessed, in parallel, by each thread 1240, 1245, and 1250 in thread block 1230. Threads can access data in shared memory 1235 loaded from device memory 1220 by other threads within the same thread block (e.g., thread block 1230). The device memory 1220 is accessed by all blocks of the grid and may be implemented using, for example, Dynamic Random-Access Memory (DRAM).

Each thread can have one or more levels of memory access. For example, in the architecture 1200 of FIG. 12, each thread may have three levels of memory access. First, each thread 1240, 1245, 1250, can read and write to its corresponding registers 1255, 1260, and 1265. Registers provide the fastest memory access to threads because there are no synchronization issues and the register is generally located close to a multiprocessor executing the thread. Second, each thread 1240, 1245, 1250 in thread block 1230, may read and write data to the shared memory 1235 corresponding to that block 1230. Generally, the time required for a thread to access shared memory exceeds that of register access due to the need to synchronize access among all the threads in the thread block. However, like the registers in the thread block, the shared memory is typically located close to the multiprocessor executing the threads. The third level of memory access allows all threads on the device 1210 to read and/or write to the device memory. Device memory requires the longest time to access because access must be synchronized across the thread blocks operating on the device. Thus, in some embodiments, the processing of each image patch is coded such that it primarily utilizes registers and shared memory and only utilizes device memory as necessary to move data in and out of a thread block.

The embodiments of the present disclosure may be implemented with any combination of hardware and software. For example, aside from parallel processing architecture presented in FIG. 12, standard computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions a computing system's processor to generate signals representing the GUI display images. The processor, under control of an executable procedure or executable application, manipulates the GUI display images in response to signals received from the input devices. In this way, the user may interact with display images using the input devices, enabling user interaction with the processor or other device.

As used herein, the term "module" can refer to either or both of: (i) a software component that causes an electronic device to accept various inputs and generate certain outputs; or (ii) an electronic input/output interface, such as a panel, frame, textbox, window or other portion of a GUI.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f) unless the element is expressly recited using the phrase "means for."

We claim:

1. A method for determining an abnormality score map for Single-photon Emission Computed Tomography (SPECT) gamma camera flood analysis, the method comprising:
   extracting a plurality of image patches from an input flood image;
   generating a feature vector for each image patch;
   generating a per-patch abnormality score for each feature vector by comparing the feature vector against a normal flood feature dictionary comprising one or more normal flood feature vectors generated using a plurality of normal flood images;
   generating an abnormality score map depicting the per-patch abnormality scores for the input flood image.

2. The method of claim 1, wherein the normal flood dictionary is generated using normal flood image patches extracted from the plurality of normal flood images.

3. The method of claim 2, wherein the normal flood image patches are extracted using an overlapping windowing method that extracts overlapping views of the normal flood images.

4. The method of claim 3, wherein the overlapping windowing method uses adjacent windows of a predetermined size shifted by a single row or column of each normal flood image.

5. The method of claim 4, wherein the predetermined size 128×128 pixels.

6. The method of claim 4, wherein the normal flood image patches are a subset of all possible patches present in the normal flood images.

7. The method of claim 6, wherein the subset comprises:
   a group of possible patches spaced by a predetermined step size across each dimension of the normal flood images, and
   all edge patches included in the possible patches.

8. The method of claim 2, wherein the normal flood feature dictionary is generated using the normal flood image patches using a process comprising:
   using a trained convolutional neural network to extract a normal flood feature vector for each normal flood image patch,
   applying a clustering algorithm to the normal flood feature vectors, thereby yielding a reduced set of normal flood feature vectors,
   wherein the normal flood feature dictionary comprises the reduced set of normal flood feature vectors.

9. The method of claim 8, wherein the clustering algorithm is a k-means clustering algorithm.

10. The method of claim 8, wherein the feature vectors are generated for each image patch of the input flood image using the trained convolutional neural network.

11. The method of claim 1, wherein the per-patch abnormality score is generated for each questionable feature vector by a process comprising:
    identifying a subset of the normal flood feature vectors in the normal flood feature dictionary that are closest to the feature vector;
    calculating the per-patch abnormality score for the feature vector by averaging the Euclidean distance between each of the subset of the normal flood feature vectors and the feature vector.

12. The method of claim 1, further comprising:
    for each pixel in the input flood image, calculating a per-pixel abnormality score by averaging abnormality scores associated with each flood patch that contains the pixel,
    wherein the abnormality score map depicts the per-pixel abnormality scores for each pixel in the input flood image.

13. The method of claim 12, further comprising:
    applying a threshold to the abnormality score map to designate one or more regions of the input flood image as being potentially abnormal,
    wherein the threshold is defined as pre-determined number of standard deviations from a mean value of the per-pixel abnormality scores.

14. A system for determining an abnormality score map for Single-photon Emission Computed Tomography (SPECT) gamma camera flood analysis, the system comprising:
    a SPECT scanner configured to generate an input flood image;
    a computing system comprising one or more processors configured to:
      extract a plurality of image patches from the input flood image,
      generate a feature vector for each image patch,
      generate a per-patch abnormality score for each feature vector by comparing the feature vector against a normal flood feature dictionary comprising one or more normal flood feature vectors generated using a plurality of normal flood images, and
      generate an abnormality score map depicting the per-patch abnormality scores for the input flood image.

15. The system of claim 14, wherein the computing system is coupled to the SPECT scanner, and the system further comprises:
    a display for presenting the abnormality score map.

16. A method for generating a feature dictionary for use in Single-photon Emission Computed Tomography (SPECT) gamma camera flood analysis, the method comprising:
    extracting a plurality of normal flood image patches from a plurality of normal flood images;

using a trained convolutional neural network to extract a normal flood feature vector for each normal flood image patch;

applying a clustering algorithm to the normal flood feature vectors, thereby yielding a reduced set of normal flood feature vectors;

creating a normal flood feature dictionary comprising the reduced set of normal flood feature vectors; and deploying the normal flood feature dictionary to one or more SPECT scanners for performing gamma camera flood analysis.

17. The method of claim 16, wherein the normal flood image patches are extracted using an overlapping windowing method that extracts overlapping views of the normal flood images.

18. The method of claim 16, wherein the overlapping windowing method uses adjacent windows of a predetermined size shifted by a single row or column of each normal flood image.

19. The method of claim 16, wherein the normal flood image patches is a subset of all possible patches comprising:
a group of possible patches spaced by a predetermined step size across each dimension of the normal flood images, and
all edge patches included in the possible patches.

* * * * *